US007778239B2

(12) United States Patent
Furukawa (10) Patent No.: US 7,778,239 B2
(45) Date of Patent: Aug. 17, 2010

(54) COMMUNICATION APPARATUS AND COMPUTER USABLE MEDIUM

(75) Inventor: Akihiro Furukawa, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 278 days.

(21) Appl. No.: 11/534,038

(22) Filed: Sep. 21, 2006

(65) Prior Publication Data
US 2007/0064683 A1 Mar. 22, 2007

(30) Foreign Application Priority Data
Sep. 22, 2005 (JP) ............................ 2005-276925

(51) Int. Cl.
*H04L 12/66* (2006.01)
(52) U.S. Cl. .............. 370/352; 379/220.01; 379/221.06
(58) Field of Classification Search ................ 370/352; 709/238; 330/285, 295; 707/3; 395/575; 379/220.01, 221.06
See application file for complete search history.

(56) References Cited

U.S. PATENT DOCUMENTS

| 5,119,488 | A  | * | 6/1992  | Takamatsu et al. | ............. | 714/4   |
|-----------|----|---|---------|------------------|---------------|---------|
| 6,438,605 | B1 | * | 8/2002  | Idehara          | ............. | 709/238 |
| 6,498,964 | B1 | * | 12/2002 | Ogura et al.     | ............. | 700/213 |
| 7,142,321 | B2 | * | 11/2006 | Tomita et al.    | ............. | 358/1.15 |
| 7,375,860 | B2 | * | 5/2008  | Schlank et al.   | ............. | 358/468 |
| 7,376,956 | B2 | * | 5/2008  | Sodhi            | ............. | 719/312 |
| 7,379,930 | B2 | * | 5/2008  | Kasatani         | ............. | 707/3   |
| 7,380,243 | B2 | * | 5/2008  | Sugishita et al. | ............. | 717/168 |
| 2003/0100308 | A1 | * | 5/2003 | Rusch          | ............. | 455/445 |

FOREIGN PATENT DOCUMENTS

| JP | 2002103751 | 4/2002 |
| JP | 2005026965 | 1/2005 |

* cited by examiner

Primary Examiner—Ahmad F Matar
Assistant Examiner—Antim Shah
(74) Attorney, Agent, or Firm—Baker Botts L.L.P.

(57) ABSTRACT

A communication apparatus operates to realize multiple communication functions in accordance with multiple client applications. The multiple functions include a step of causing the communication apparatus to function as a client that obtains data from an external server device through the networks and processes the obtained data or to process other data the communication apparatus stores and to transmit the processed data to the external server device, multiple communication interfaces respectively connected to the networks, an interface priority storage storing priority information representing priorities, in usage, of the multiple communication interfaces when each of the multiple client applications is executed for each of the multiple client applications, a communication interface determining system determines a communication interface to be used in accordance with the priority information retrieved from the interface priority storage. The client application is executed using the communication interface determined to be used by the communication interface determining system.

10 Claims, 9 Drawing Sheets

| LIST No. | MEANING | INTERFACE LIST |
|---|---|---|
| 1 | WIRED NETWORK PRIORITY | WIRED(1) → WIRELESS(2) → LIST COMPLETION(0) |
| 2 | WIRELESS LAN PRIORITY | WIRELESS(2) → WIRED(1) → LIST COMPLETION(0) |
| 3 | WIRED NETWORK FIXED | WIRED(1) → LIST COMPLETION(0) |
| 4 | WIRELESS LAN FIXED | WIRELESS(2) → LIST COMPLETION(0) |
| 5 | NO DESIGNATION | ROUTING TABLE(-1) → WIRED(1) → WIRELESS(2) → LIST COMPLETION(0) |

(*)····*DENOTES INTERFACE ID

FIG. 4

| CLIENT APPLICATION | LIST No. |
|---|---|
| E-mail Reports | 1 |
| E-mail Notification | 1 |
| LDAP CLIENT | 3 |
| Scan To Web DAV | 5 |
| Scan To FTP | 5 |
| INTERNET FAX RECEPTION(CLIENT) | 2 |
| INTERNET FAX TRANSMISSION | 4 |

| LIST No. | MEANING | INTERFACE LIST |
|---|---|---|
| 1 | WIRED NETWORK PRIORITY 1 | WIRED(1),(2) → WIRELESS(2) → LIST COMPLETION(0) |
| 2 | WIRED NETWORK PRIORITY 2 | WIRED(1) → WIRED(3) → WIRELESS(2) → LIST COMPLETION(0) |
| 3 | WIRED NETWORK PRIORITY 3 | WIRED(3) → WIRED(1) → WIRELESS(2) → LIST COMPLETION(0) |
| 4 | WIRELESS LAN PRIORITY | WIRELESS(2) → WIRED(1),(3) → LIST COMPLETION(0) |
| 5 | WIRED NETWORK FIXED 1 | WIRED(1),(3) → LIST COMPLETION(0) |
| 6 | WIRED NETWORK FIXED 2 | WIRED(1) → LIST COMPLETION(0) |
| 7 | WIRED NETWORK FIXED 2 | WIRED(3) → LIST COMPLETION(0) |
| 8 | WIRELESS LAN FIXED | WIRELESS(2) → LIST COMPLETION(0) |
| 9 | NO DESIGNATION | ROUTING TABLE(-1) → WIRED(1),(3) → WIRELESS(2) → LIST COMPLETION(0) |

(*)····*DENOTES INTERFACE ID

FIG.10

COMMUNICATION APPARATUS AND COMPUTER USABLE MEDIUM

CROSS-REFERENCE TO RELATED APPLICATION

This application claims priority under 35 U.S.C. §119 from Japanese Patent Application No. 2005-276925, filed on Sep. 22, 2005. The entire subject matter of the application is incorporated herein by reference.

BACKGROUND

1. Technical Field

Aspects of the present invention relate to a communication apparatus such as an MFP (Multi-Function Peripheral), which apparatus has multiple communication interfaces and is used with being connected to a network. Aspects of the invention also relate to a computer usable medium containing a computer program which can be executed by the communication apparatus.

2. Related Art

Recently, the communication apparatus as above (e.g., the MFP having multiple functions such as a printer, facsimile machine, scanner and/or copier, and capable of transmitting/receiving data with a network communication) has been widely used. In order to share such functions, even in so-called low-end apparatuses, multiple communication interfaces are provided as regular equipment. The equipped communication interface typically includes a wired-communication interface and a wireless LAN interfaces.

Examples of such an MFP are disclosed in Japanese Patent Provisional Publications No. P2002-103751A (hereinafter, referred to as '751 publication) and No. P2005-26965A (hereinafter, referred to as '965 publication). In '751 publication, disclosed is a technique of selecting one of multiple interfaces to be used based on a data receiving rate, in accordance with a priority assigned to each interface in advance. In '965 publication, disclosed is a technique of selecting one of appropriate applications based on the communication speed of the network and/or communication quality.

SUMMARY

Aspects of the invention provide a communication apparatus and a computer usable medium containing a program therefor, which enable execution of multiple applications simultaneously without lowering a data transmission efficiency. Further, the networks can be selected based on the applications.

DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided a communication apparatus having multiple communication functions and to be connected to networks. The communication apparatus is provided with a controller that causes the communication apparatus to realize the multiple communication functions in accordance with multiple client applications, the multiple functions including at least one of a step of causing the communication apparatus to function as a client that obtains data to be processed from an external server device through the networks and to process the obtained data, and a step of causing the communication apparatus to process other data the communication apparatus stores and to transmit the processed data to the external server device; multiple communication interfaces respectively connected to the networks; an interface priority storage that stores priority information representing priorities, in usage, of the multiple communication interfaces when each of the multiple client applications is executed for each of the multiple client applications; a communication interface determining system that retrieves the priority information corresponding to a client application to be executed from the interface priority storage and determines a communication interface to be used in accordance with the priority information as retrieved; and an application executing system that executes the client application to be executed using the communication interface determined to be used by the communication interface determining system.

According to aspects of the invention, there is also provided a computer usable medium containing computer readable instructions to be executed by a computer which can be implemented in a communication apparatus having multiple communication functions and to be connected to networks, the communication apparatus capable of executing the multiple communication functions in accordance with multiple client applications, the multiple functions including at least one of a step of causing the communication apparatus to function as a client that obtains data to be processed from an external server device through the networks and to process the obtained data, and a step of causing the communication apparatus to process other data the communication apparatus stores and to transmit the processed data to the external server device. The computer readable instructions provide, when executed by the computer, the communication apparatus with functions of: an interface priority storage that stores priority information representing priorities, in usage, of the multiple communication interfaces when each of the multiple client applications is executed for each of the multiple client applications; a communication interface determining system that retrieves the priority information corresponding to a client application to be executed from the interface priority storage and determines a communication interface to be used in accordance with the priority information as retrieved; and an application executing system that executes the client application to be executed using the communication interface determined to be used by the communication interface determining system.

According to the above configuration, the communication interface is determined for each client application. Therefore, for the client applications which may be executed substantially simultaneously, settings can be made so that different communication interfaces are used. With such a configuration, it is possible to prevent lowering of data transmission efficiency when such client applications are executed substantially simultaneously. Further, for the client application handling secure or confidential information, a communication interface to be connected to a communication network having a high security level can be assigned. Therefore, security is improved.

The communication apparatus may further include a priority information input unit that allows input of the priority information corresponding to the multiple communication interfaces; and a priority information setting system that causes the interface priority storage to store the priority information input through the priority information input unit in association with identification information of the communication interfaces.

Even when the settings are made such that different communication interfaces are used for the client applications which are likely to be executed substantially simultaneously, possibility of such a situation may vary. Further, the configurations of the networks connected to such communication interfaces may be changed, and depending on the changes of the configuration, the security level of the networks may change. According to the above configuration, the priority of each communication interface to be used for each client application can be changed. Therefore, the settings can be changed so that the communication interface optimum to the client application can be used. Such a configuration is advantageous in that change of the usage of client applications and environmental change (e.g., connection conditions, etc.) of the networks can be reflected flexibly.

The priority information may indicate more than one communication interfaces to be used by the corresponding client application. It is noted that a communication network may not be available as the traffic increases or the transmission speed is lowered. According to the above configuration, even if the optimum communication interface corresponding to the client application to be executed is unavailable, the next optimum communication interface can be defined. Therefore, the usage of the communication interfaces can be set flexibly.

The communication interface determining system may include: a usable interface selecting system that select a usable communication interface to be used when the client application is executed from among the multiple communication interfaces in accordance with the priority information; an availability judging system that judges whether the usable communication interface selected by the usable interface selecting system is available; and a usable interface determining system that determines the usable communication interface as the communication interface to be used if the availability judging system judges that the usable communication interface is available, the usable interface determining system causing the usable interface selecting system to select a communication interface having a next priority if the availability judging system judges that the usable communication interface is unavailable.

It is noted that a communication network may not be available as the transmission speed is lowered. According to the above configuration, even if the optimum communication interface corresponding to the client application to be executed cannot connect to the server device, the next optimum communication interface can be defined and attempt can be made to connect to the server device. Therefore, the usage of the communication interfaces can be set flexibly.

The interface availability judging system may attempt to connect the server device using the usable communication interface selected by the usable interface selecting system, the interface availability judging system determining the usable communication interface is unavailable if the connection to the server device is not achieved within a predetermined period of time.

The priority information may include a priority assigned to a plurality of communication interfaces. The usable interface determining system may include: an access availability checking system that transmits predetermined data to each of the plurality of communication interfaces having the same priority to check the availability of all the plurality of communication interfaces having the same priority; an access availability receiving system that receives access availability information containing information whether the interface is available, which is returned from respective ones of the plurality of communication interfaces having the same priority in response to the predetermined data transmitted by the access availability checking system; and an availability judging system that determines that a communication interface is available if the access availability receiving system receives the access availability information containing information representing an availability of the communication interface, the availability judging system determining that a communication interface is unavailable if the access availability receiving system receives the access availability information containing information representing an unavailability of the communication interface. The availability judging system may determine one of the communication interfaces that transmits the access availability information earliest among the plurality of communication interfaces as the usable communication interface if the availability judging system receives the access availability information representing that the communication interface is available from each of the plurality of communication interfaces. As above, if there are multiple communication interfaces having the same priority, by selecting the communication interface which can be connected to the server device earliest, a network having a higher data transmission efficiency can be used.

The priority information may define a predetermined communication interface as a single usable communication interface, and the other communication interfaces as unusable ones. According to such a configuration, when the client application to be executed handles secure data, the network to be used can be limited to one having a high security level.

The communication apparatus may further include an access path determining system that determines an access path, which includes the communication interface, to the server device based on a priority access path information preliminarily stored in a routing table. The priority information may define a communication interface included in the access path determined by the access path determining system as the usable communication interface. The routing table may store access path information indicative of network addresses of destinations and communication interfaces to be used when connected to the network addresses, and metric values for determining which one has priority when the table includes multiple access paths for the same destinations. When the client application is executed, even if the priority is not assigned to the communication interfaces, an appropriate communication interface can be automatically set by using the routing table.

The multiple communication interfaces may include at least a wireless communication interface and a wired communication interface. According to such a configuration, i.e., by employing the wireless communication interface, it becomes possible to use wireless terminals (mobile terminals) within a connectable area without using hardware (e.g., LAN cables) and work of connecting the cables. Therefore, it is particularly convenient when the communication apparatus is used by outsiders or public user.

When the client application is of a first predetermined category, the priority information may define one of a wired communication priority setting and a wired communication fixed setting, the wired communication priority setting being a setting where the wired communication interface has a first priority and the wireless communication interface is a second priority, the wired communication fixed setting being a setting where only the wired communication interface is allowed to be used. Further, when the client application is of a second predetermined category, the priority information may define the wireless communication priority setting and a wireless communication fixed setting, the wireless communication priority setting being a setting where the wireless communication interface has a first priority and the wired communication interface is a second priority, the wireless communication fixed setting being a setting where only the wireless communication interface is allowed to be used.

With this configuration, a setting directed to the data transmission efficiency (i.e., the wired or wireless communication interface has a priority), a setting directed to a high security (i.e., the wired communication interface has a priority), and operability (i.e., the wireless communication interface has a priority) can be selectively used depending on the client application to be executed.

The client application falling in the first category may require an input operation by a user, and the client application falling in the second category may not require the input operation by the user. When the user is required to perform an input operation, it is preferable that the application responds quickly, while when the user is not required to perform the input operation, such a responsibility is not so important. Therefore, when the response is important, it is preferable that the wired communication is used, otherwise, the wireless priority setting or wireless fixed setting is appropriate.

Embodiment

Hereinafter, referring to the accompanying drawings, a network system including an MFP connected to the network according to aspects of the invention will be described.

Figure 1:
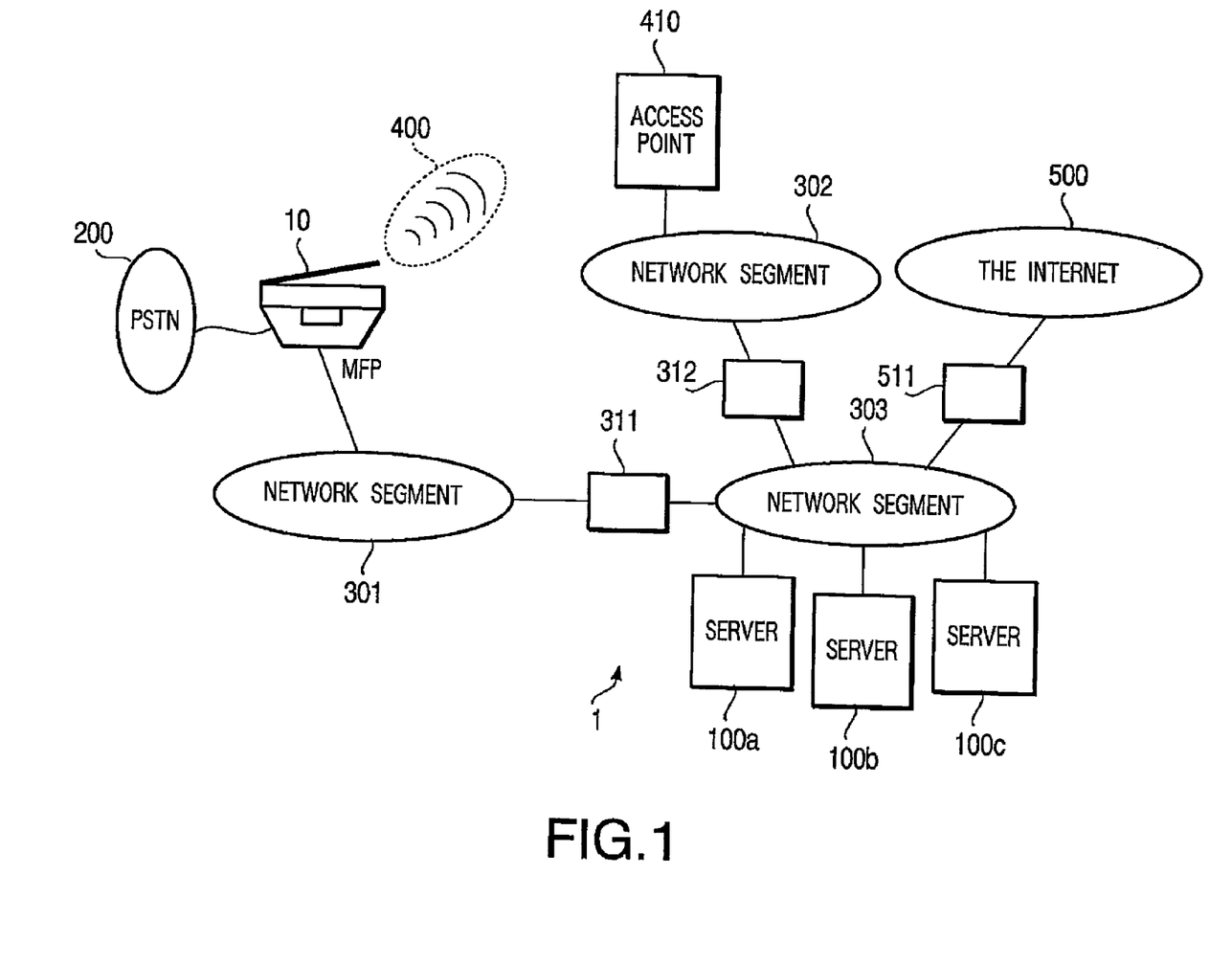
FIG. 1 schematically shows a configuration of a network system to which an MFP according to aspects of the invention is connected.

FIG. 1 schematically shows a configuration of the network system 1 according to aspects of the invention. In the network system 1 shown in FIG. 1, an MFP 10 is connected to server devices 100a, 100b and 100c through wired communication networks 301 and 303. The MFP 10 is also connected to the server devices 100a, 100b and 100c through a wireless communication network 400 and wired communication networks 302 and 303. The networks 301, 302, 303 and 400 are interconnected through a wireless access point 410 or routers 311 and 312. According to this exemplary embodiment, the wired communication networks 301, 302 and 303 are network segments configured with LAN cables and the like. The wireless communication network 400 is configured with wireless connections among devices. The MFP 10 is connected to a PSTN 200, which is a kind of wired communication network. Through the PSTN 200 (which is indicated simply as the telephone network in FIG. 1), transmission/reception of facsimile data, and a dial-up connection to the Internet are available. Further, the MFP 10 is capable of accessing external server devices via the router 511 provided to the network segment 303 and the Internet. The routers 311 and 312 are local routers that connect networks, while the router 511 is a broadband router connecting to the Internet. In this exemplary embodiment, the server device 100a is a mail server that has functions of SMTP server and POP3 server, the server device 100b is configured to function as an FTP server and a Web DAV server, and the server device 100c is configured to function as an LDAP server.

Figure 2:
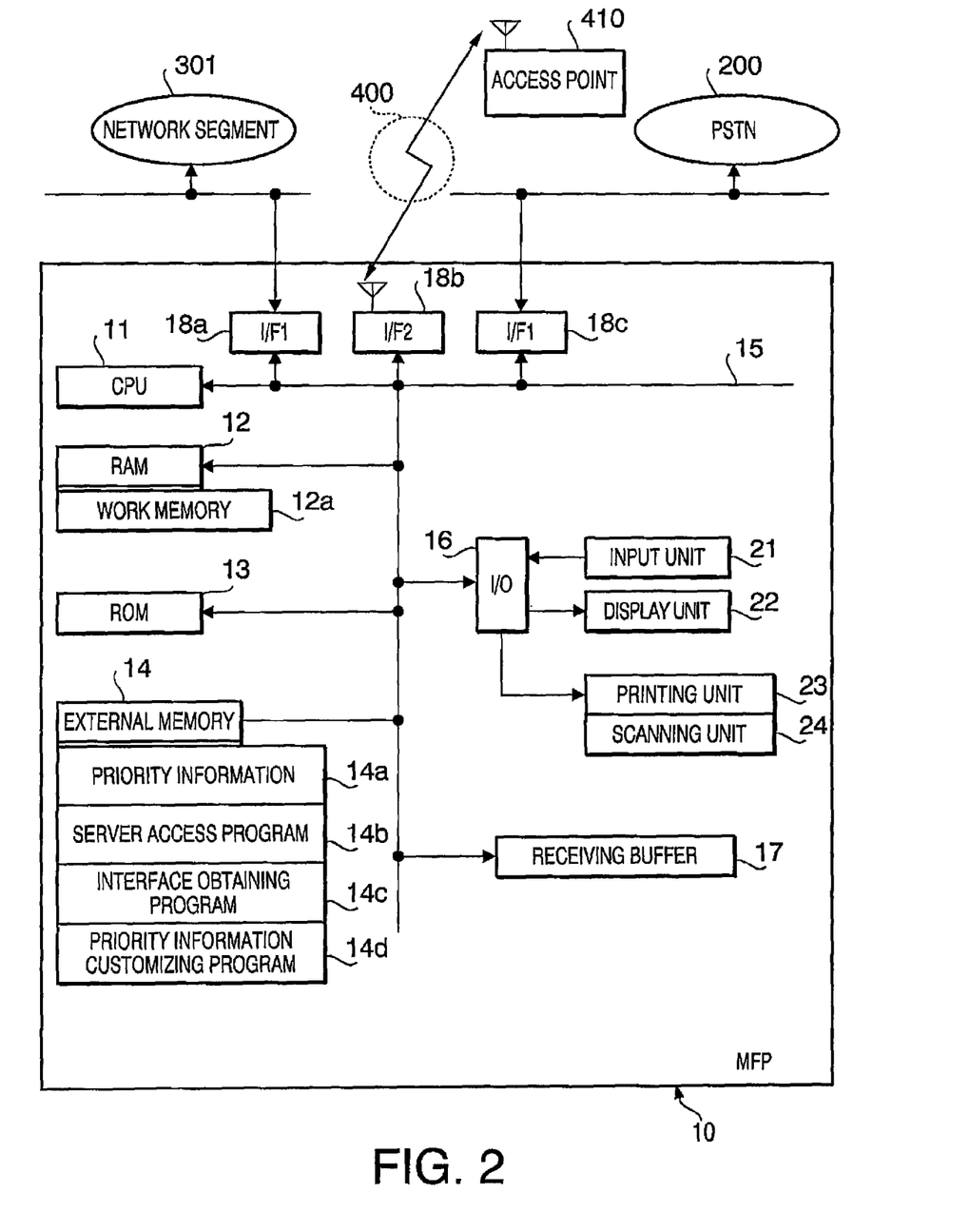
FIG. 2 is a block diagram illustrating a electronic configuration of the MFP according to aspects of the invention.

FIG. 2 is a block diagram illustrating an electronic configuration of the MFP 10. The MFP 10 (which is a computer hardware) is provided with CPU 11, RAM 12 (volatile memory), ROM 13, an external memory (rewritable non-volatile memory, a flash memory in this exemplary embodiment), a communication interface (I/F1) 19a that communicates with the wired communication network 301, another communication interface (I/F2) 18b that communicates with the wireless access point 410 via the wireless communication network 400, a further communication interface (I/F3) 18c that is connected to the PSTN 200. The MFP 10 further includes a reception buffer memory 17 configured to temporarily store print control data which is received via the networks 200, 301 and 400, and I/O (input/output) unit 16. The above components are interconnected via internal bus 15. To the I/O unit 16, an input unit 21 provided with a touch panel, depression keys and ten keys, and display unit 22 having an LCD (Liquid Crystal Display) are connected. Further, to the I/O unit 16, a printing unit 23 such as a well-known inkjet printing mechanism, a laser printing mechanism, thermal transfer printing mechanism or dot impact type printing mechanism, and a scanner unit 24 used for copying and/or scanning an image are connected. With this configuration, in the MFP 10, a printing function and a scanning function are realized. Furthermore, with a facsimile control program stored in the ROM 13, a facsimile function is also realized.

Figure 3:
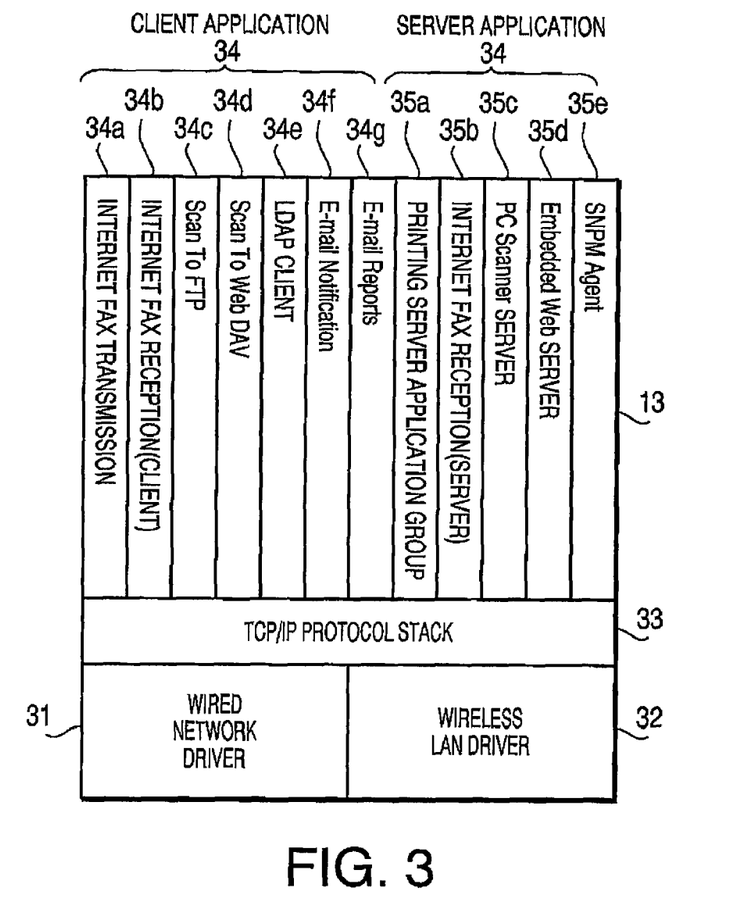
FIG. 3 shows a hierarchy diagram of network software stored in a ROM.

FIG. 3 schematically shows a structure of data/software stored in the ROM 13 of the MFP 10. As shown in FIG. 3, the ROM 13 stores a wired network driver 31, a wireless LAN network driver 32, a TCP/IP protocol stuck 33, a client application 34 and a server application 35. The above software (applications/drivers) are executed by the CPU 11 using the work area 12 provided in the RAM 12.

The wired network driver 31 is software for driving a wired communication network (LAN) controller, and provides packet transmission/reception function on the wired communication network, I/O control function (e.g., initialization, multicast address setting, link up/down controlling) to the TCP/IP protocol stuck 33. The wireless LAN network driver 32 driver software for driving the wireless LAN controller, and provides packet transmission/reception function on the wireless communication network, I/O control function (e.g., initialization, multicast address setting, link up/down controlling) to the TCP/IP protocol stuck 33. The TCP/IP protocol stuck 33 is software layer for supporting a communication through a network using the TCP/IP.

The client application 34 causes the MFP 10 to function as a client, and realizes predetermined communication function the MFP 10 has (e.g., an Internet facsimile transmission/reception function—when function as a client—), a scanned image transferring function, an e-mail transmission function, etc.

Specifically, the client applications 34 according to the exemplary embodiment includes an Internet facsimile transmission client application 34a, an Internet facsimile reception client application 34b, a Scan To FTP (File Transfer Protocol) client application 34c, a Scan To WEBDAV (Distributed Authoring and Versioning protocol for the WWW) client application 34d, an LDAP (Lightweight Directory Access Protocol) client application 34e, e-mail notification client application 34f, and an e-mail Reports client application 34g.

The Internet facsimile transmission client application 34a executes an Internet facsimile transmission in accordance with ITU-T.47, and transmits an Internet mail message with image file data being attached to the Internet mail message. The Internet mail is transmitted to a predetermined mail server 100a. The Internet facsimile reception client application 34b executes an Internet facsimile reception in accordance with ITU-T.47, and accesses a predetermined mail server 100a as a mail reception client, receives Internet mail messages attached with image file data, prints the received mail/image, stores the received facsimile data in the external memory of the MFP 10, and transmits another facsimile device on the PSTN 200 side. A Scan To FTP client application 34c stores image data scanned and generated by the scanner function of the MFP 10 or the image data scanned by another scanner and transmitted to the MFP 10 in a designated directory of a designated FTP server 100b as a file. A Scan To WEBDAV client application 34d stores image data scanned and generated by the scanner function of the MFP 10 or the image data scanned by another scanner and transmitted to the MFP 10 in a designated directory of a designated WEBDAV (which is a common file access protocol provided by HTTP) server 100b as a file. The LDAP client application 34e accesses the LDAP server 100c and searches for e-mail addresses and/or facsimile numbers using a destination name (or a part thereof) as a criteria. An e-mail Notification client application 34f transmits error information regarding the MFP 10 (e.g., toner low warning, running out of recording sheet, etc.) to the mail server 100a, thereby notifying an administrator of the error condition by the Internet mail. An e-mail reports client application 34g transmits consumption information regarding the MFP 10 (e.g., a value of a page counter, life of a drum, etc.) to the mail server 100a, thereby notifying the administrator of the status of consumable components periodically by the Internet mail.

The server applications 35 cause the MFP 10 to function as a server, and to acquire access from another server device such as a PC through the network so that the predetermined communication functions the MFP 10 has (e.g., the printer function, the Internet facsimile reception function, which is a function as an SMTP server, a scanner function, a remote management and/or setup function, etc.) are executed.

Specifically, The server applications 35 include, a print server application group 35a, an Internet facsimile reception server application 35b, a PC scanner server application 35c, an embedded Web server application 35d, and an SNMP Agent application 35e. The print server application group 35a is an application protocol group for printing, and includes protocols of LPR, Port910, IPP, FTP, NetBIOS over TCP/IP, and the like. The Internet facsimile reception server application 35b realizes a simple SMTP server (mail server) function and receives an Internet mail message with attachment of image data. The PC scanner server application 35c is a server application for scanning an image and acquiring scan data based on an operation of a client device such as a PC in which a scanner driver is installed. The Embedded Web server application 35d is for making use of built-in Web server in the MFP 10 and for remote management and/or setup of the MFP 10. The SNMP Agent application 35e is a server application supporting the SNMP protocol, and is also used for the remote management/setup of the MFP 10.

It should be noted that, although the client applications 34a-34f and server applications 35a-35e are stored in the ROM 13 in the above exemplary embodiment, a part of or all of the applications may be stored in the external memory 14 of the MFP 10.

Figure 4:
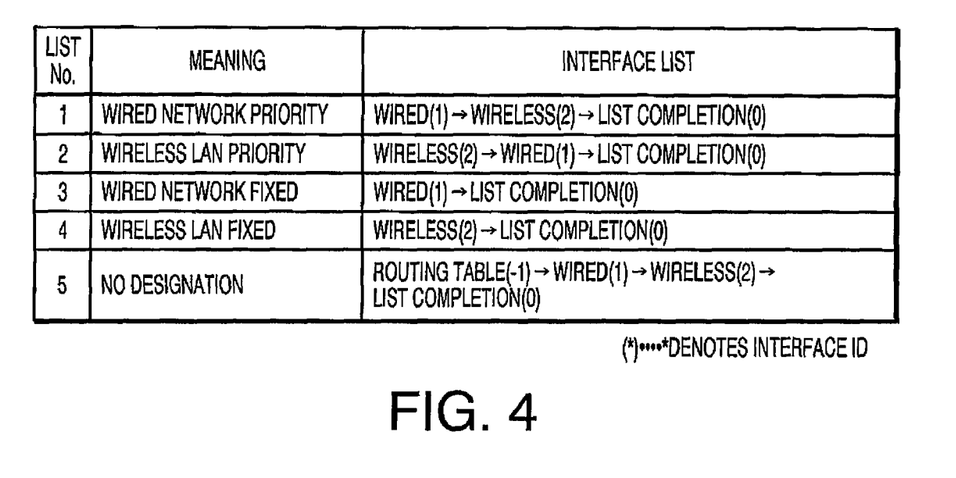
FIG. 4 is a list of interfaces.
Figure 5:
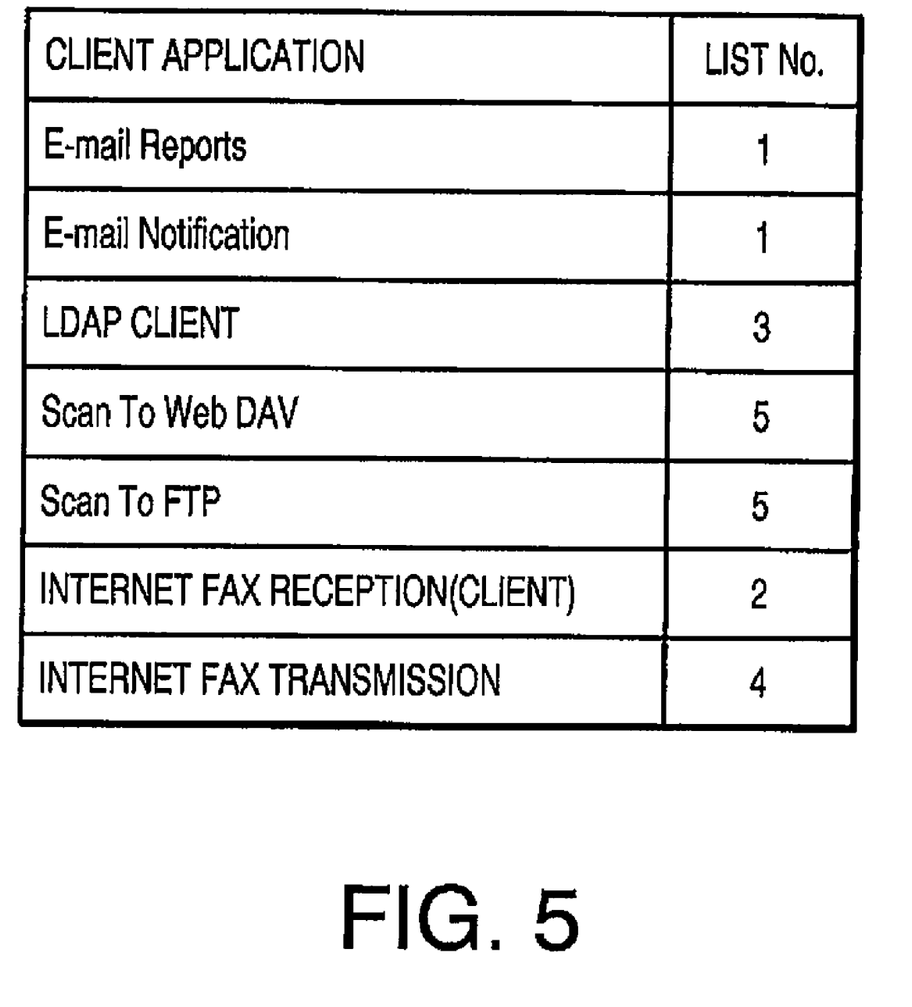
FIG. 5 shows an interface wire setting table for each client application.

In the external memory 14, priority setting information 14a for each client application is stored as shown in FIG. 5. The priority setting information 14a defines priority of usage of the communication interfaces when the client application 34 is executed. A list No. indicated in FIG. 5 corresponds to an interface list shown in FIG. 4, which designates the priority of usage of the communication interfaces. In this exemplary embodiment, the interface list is configured, as shown in FIG. 4, such that the communication interface to which the priority has been assigned is related to an interface ID (identification information for the communication interface) that identifies the communication interface.

Specifically, in FIG. 4, list No. 1 is a wired communication network priority setting in which the wired communication network is used by priority. According to the exemplary embodiment, the first priority is assigned to the wired communication interface 18a (Interface ID=1) connected with the wired communication network, and the second priority is assigned to the wireless communication interface 18b (Interface ID=2) connected with the wireless communication network. This setting will be referred to as a wired communication priority setting.

List No. 2 is a wireless communication network (wireless LAN) priority setting in which the wireless communication network is used by priority. In this exemplary embodiment, the wireless communication interface 18b (Interface ID=2) connected with the wireless communication network, the wired communication interface 18a (Interface ID=1) connected with the wired communication network are assigned with the priority in this order. This setting will be referred to as a wireless communication priority setting.

List No. 3 is a wired communication network priority setting in which only the wired communication network is used fixedly. In this setting, the priority is assigned to the wired communication interface 18a (Interface ID=1), while no other interfaces are used. This setting will be referred to as a wired communication fixed setting.

List No. 4 is a wireless communication network priority setting in which only the wireless communication network is used fixedly. In this setting, the priority is assigned to the wireless communication interface 18b (Interface ID=2), while no other interfaces are used. This setting will be referred to as a wireless communication fixed setting.

List No. 5 is configured such that the first priority is assigned to a communication according to a prescribed routing table (Interface ID=−1). Then, a second priority is assigned to the wired communication network 18a (Interface ID=1), and a third priority is assigned to the wireless communication network 18b (Interface ID=2).

In the above interface lists, the lowest priority is assigned to a completion of list (Interface ID=0).

In the exemplary embodiment, the priority setting information 14a of the communication interface defined for each client application is set as follows. That is for the Internet facsimile transmission client application 34a, the wireless communication fixed setting is used. For the Internet facsimile reception client application 34b, the wireless communication priority setting is used. For the other applications, wired communication priority setting or the wired communication fixed setting is used. With this configuration, for example, when the Internet facsimile transmission and reception are executed, and data transmission/reception using the Scan To FTP client application 34c and Scan To WEBDAV client application 34d are executed, the communication interfaces used by respective applications are differentiated. Therefore, the data transmission by both applications can be executed simultaneously. In other words, when multiple client applications are executed simultaneously, the communication interfaces to which the MFP 10 is directly connected can be used parallelly and simultaneously. Further, since different communication interfaces are used by the different client applications, data transmission efficiencies will not be lowered by each other. Further, since the Internet facsimile transmission/reception utilizes the Internet mail, the operation does not guarantee a real time transmission/reception. Therefore, even if the transmission/reception speed is somewhat lowered, it may not cause a big problem as far as the transmission/reception is performed without disturbing other functions. Thus, by using the wireless communication priority setting or wireless communication fixed setting is used for the Internet facsimile transmission/reception, and by using the wired communication priority setting or wired communication fixed setting is used for the other applications, the entire process speed can be raised.

In the exemplary embodiment, the LDAP client application 34e is set to use the wired communication fixed setting. The LDAP client application 34e realizes a function of searching for personal information including a name, a mail address, a facsimile number, a telephone number and the like. By using the wired communication fixed setting, leakage of such information can be well prevented. In other words, for the LDAP client application 34e, the wireless communication setting is not used since the information leaks relatively easily when the searching for information is performed through the wireless LAN.

In the external memory 14, as a route information regarding delivery of IP packets, a well-known routing table is stored. The routing table contains lots of pieces of access path information storing network addresses (and net masks) representing destinations of IP packets, communication interfaces to be used and metrics in related manner. When IP packets are delivered, the CPU 11 referred to such information and executes a routing process (i.e., determines an access route).

Further, the external memory 14 stores a server access program 14b for determining a communication interface to be used when a client application is executed, an interface list obtaining program 14c for obtaining interface lists when the server access program 14b is executed, and a priority setting information customizing program 14d for customizing the contents of the interface lists set for respective client applications.

The main functions of the MFP 10 is realized as the CPU 11 executes the server access program 14b, the interface list obtaining program 14c, the priority setting information customizing program 14d installed in the external memory 14. The server access program 14b, the interface list obtaining program 14c and the priority setting information customizing program 14d are installed in the MFP 10 by retrieving the same from a recording medium such as a CD-ROM by another management device, or another management device may download such programs through the communication network, and transmits the same to the MFP 10. Alternatively, the above programs may be preliminarily stored in the ROM 13 of the device 10.

Next, the server devices 100a, 100b and 100c will be described. The server devices 100a, 100b and 100c are configured to provide self-contained functions and data to a client device connected through the network.

Figure 6:
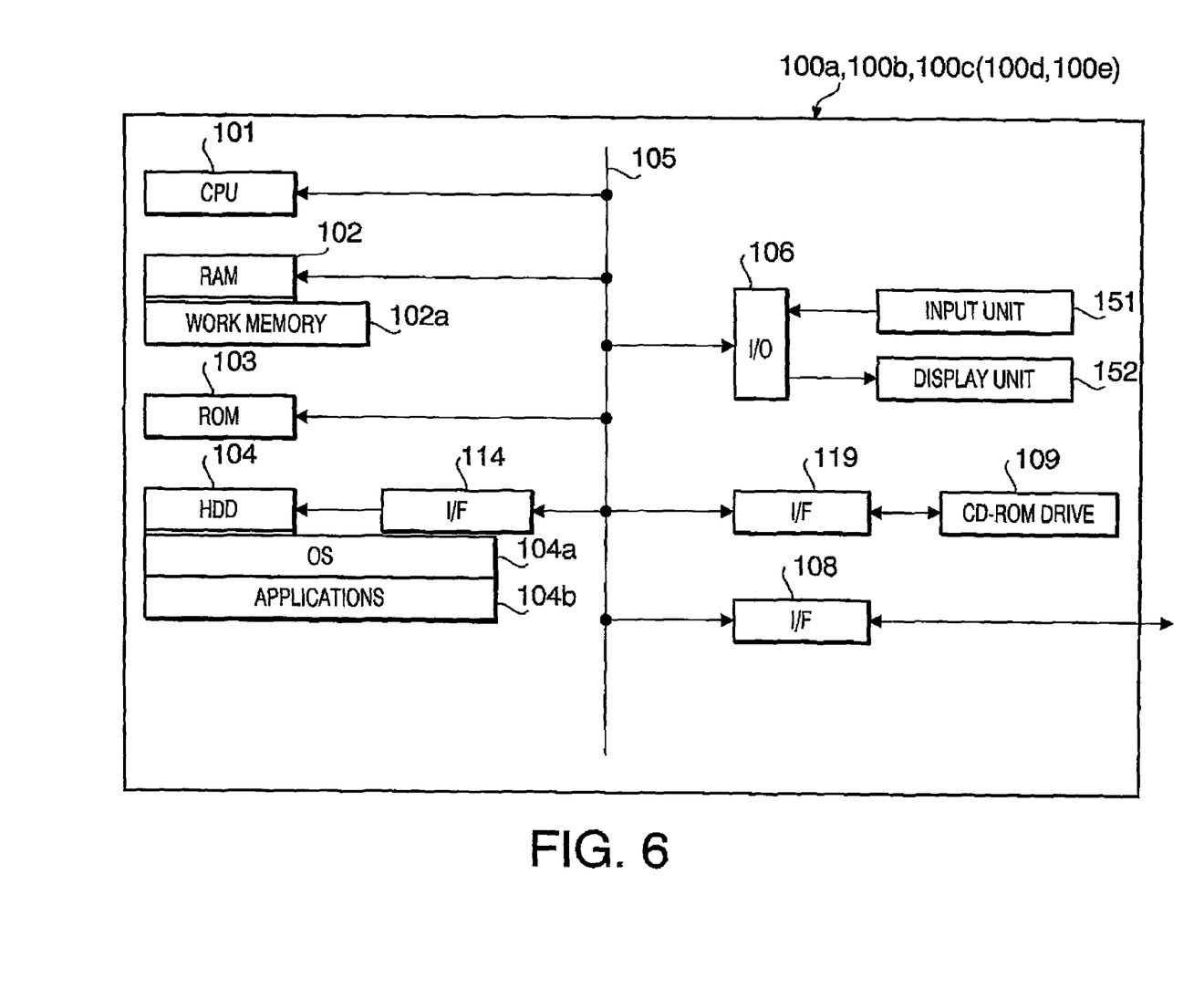
FIG. 6 shows an electric configuration of a server device according to aspects of the invention.

FIG. 6 is a block diagram showing an electronic configuration of the server device 100a which functions as the mail server, the server device 100b which functions as an FTP server and the WEBDAV server, or the server device 100c which functions as the LDAP server.

Each of the server devices 100a, 100b and 100c is a well-known PC (personal computer) or workstation. A computer hardware portion of the server device 100a (100b or 100c) includes a CPU 101, a RAM 102, a ROM 102, a communication interface (I/F) 108, and I/O (Input/Output) unit 108, which are interconnected via an internal bus 105. Further, through the interfaces (I/F) 114 and 119, a storage device (HDD: hard disk drive in the exemplary embodiment) 104 and CD-ROM drive 109 are connected. The I/O unit 106 is connected with an input unit 151 including a keyboard, mouse and the like, and a display unit 152 including an LCD or CRT.

In the storage device 104, an OS (Operating System) 104a which is the infrastructure software for the server devices 100a, 100b and 100c, and a well-know application 104a for realizing the server function in each of the server devices 100a, 100b and 100c are installed.

In the MFP 10 according to the exemplary embodiment, when the client applications 34a-34g are executed, the server access program 14b is also executed. Hereinafter, the server access program 14b will be described with reference to a flowchart shown in FIG. 7.

Figure 7:
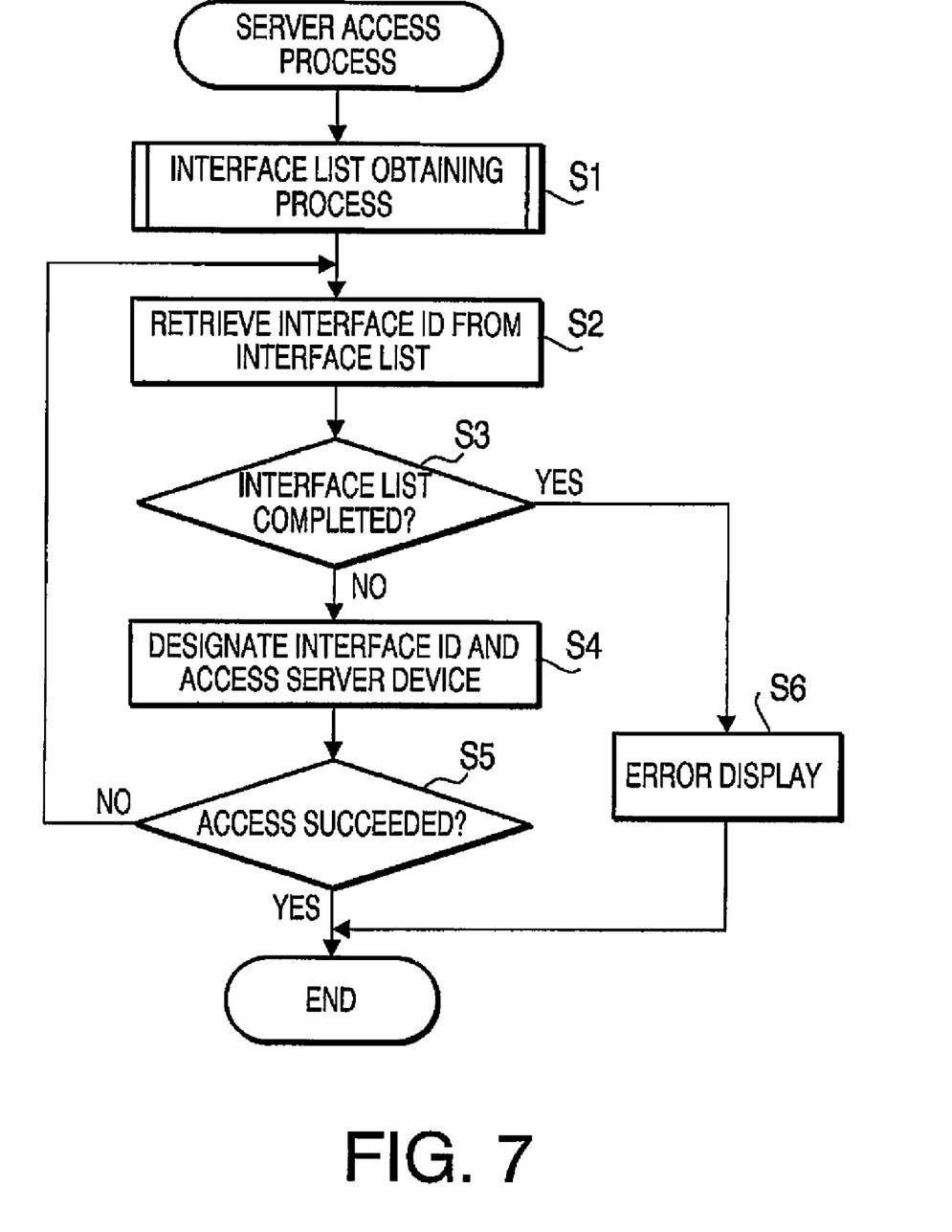
FIG. 7 shows a flowchart illustrating a sever access process defined by a server access program.

When an application to be executed is designated from among the client applications 34a-34g, the server access program 14b is executed. Firstly, an interface obtaining program 14c is executed, and an interface list defining priority information corresponding to the designated client application is obtained (S1). In S2, the process extracts an interface ID in accordance with the priority order defined by the obtained interface list. Then, the process judges whether the interface list is completed (i.e., the interface ID is equal to zero) in S3. If the process determines that the inter face list is completed (i.e., the extracted interface ID equals to zero) (S3: YES), the process proceeds to S6 and displays an error message indicating that the connection was not established on the display unit 22 of the MFP 10. Until the interface list is completed (i.e., if the extracted interface ID is not zero) (S3: NO), the process proceeds to S4. Then, the process accesses the server device designated by the executed application using the communication interface corresponding to the extracted interface ID (S4). If the access is successfully achieved (S5: YES), the process finished the server access program 14b, and the designated client application is executed using the communication interface, with which the access has been successfully achieved. If the access has been failed (S5: NO), the process returns to S2, and steps S2 and 83 are repeated. It should be noted that the availability of the communication interface may be judged whether the access is achieved within a pre-determined period (i.e., available) or not (unavailable).

If the interface ID selected for accessing the server device is (−1) in S4, the TCP/IP protocol stuck 33 determines the interface to be used in accordance with the IP address of the destination and IP addresses assigned to the communication interfaces of the MFP 10. When the interface ID is (1) or (2), the process accesses the server device with setting a static entry in the routing table when necessary. For example, the default router set in the routing table may not meet the designated interface. In such a case, if the IP address of the server device and the IP address of the designated interface belong to different subnet, and if the router address corresponding to the designated interface is registered with the routing table, the process sets the router address as a route to the server device. If such a router address is not set in the routing table, the process sets the IP address of the designated interface as the route to the server device. It should be noted that, if the process fails to access the server device, it discards the statically set route.

Figure 8:
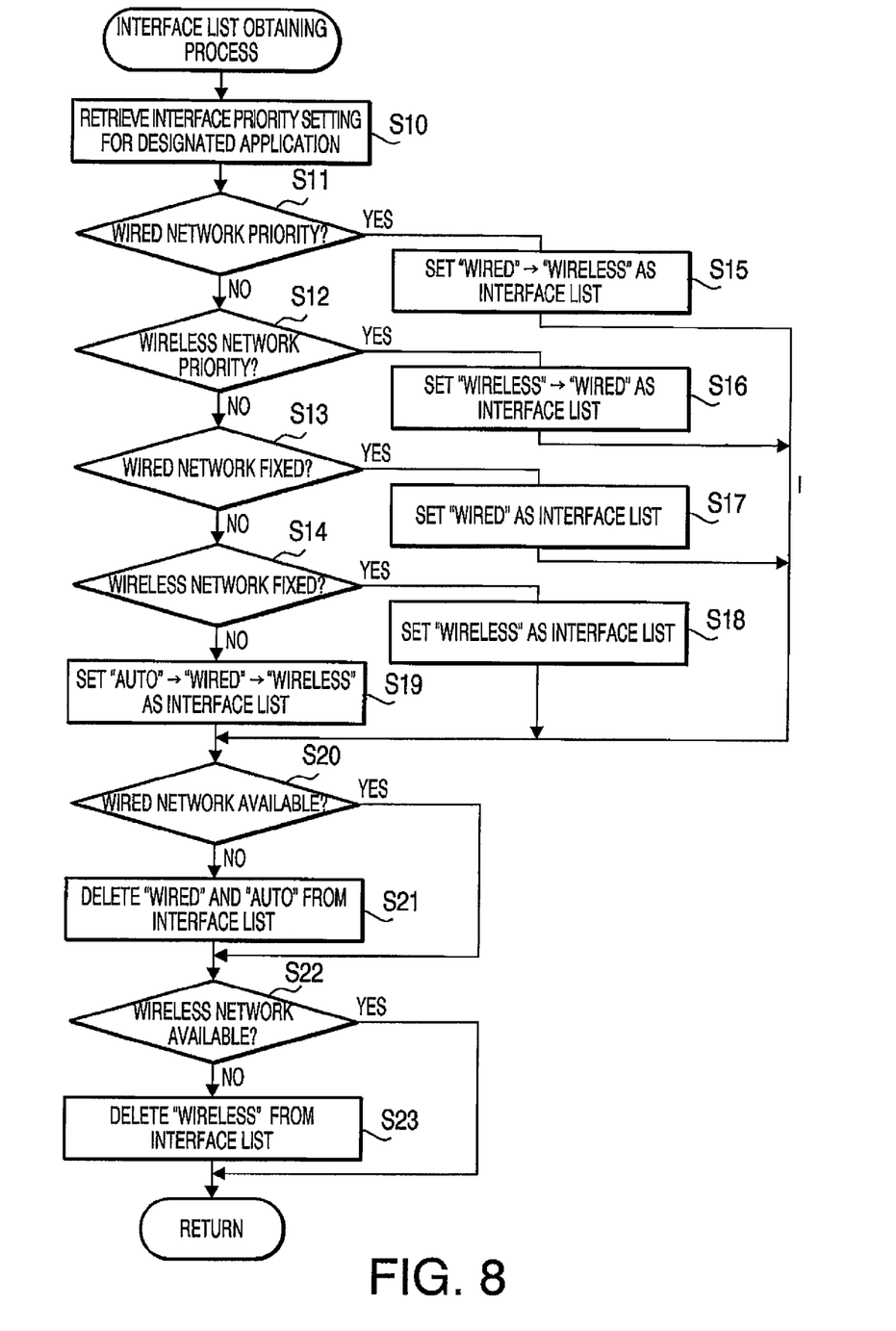
FIG. 8 shows a flowchart illustrating an interface list obtaining process defined by an interface list obtaining program.

FIG. 8 shows a flowchart illustrating the interface list obtaining process executed in S1 of the server access process shown in FIG. 7.

When the interface obtaining program 14c is started in S1 (i.e., when the interface obtaining process starts), the process firstly retrieves the interface list for the designated client application (see FIG. 5). Then, in S11-S14, the process judges which one of the interface lists should be used. In S15-19, the process determines the interface list to be used. Next, in S20, the process judges whether the wired communication network 301 connected to the wired communication interface 18a is available. If it is unavailable (S20: NO), the process proceeds to S21 and deletes the interface ID (1) of the wired communication interface 18a from the interface list. If the wired communication network 301 is available (S20: YES), the process remains the interface list as it is. In S22, the process judges whether the wireless communication network 400 connected to the wireless communication interface 18b is available. If it is unavailable (S22: NO), the process deletes the interface ID (2) of the wireless communication interface 18b from the interface list (S23). If the wireless communication network 400 is available (S22: YES), the process remains the interface list as it is. After the above steps have been completed, the interface obtaining program 14c is terminated.

In the exemplary embodiment described above, by executing the priority setting information customizing program 14d, the interface list set for each one of the client application can be customized. When the interface list is customized, by operating the input unit 23 of the MFP 10, the list number (interface list) shown in FIG. 5 for each application can be changed to another number. Alternatively, a new priority order setting may be added to the list shown in FIG. 4.

It should be noted that the invention should not be limited to the configuration of the above-described exemplary embodiment. The configuration described above can be modified in various ways without departing aspects of the invention.

Figure 9:
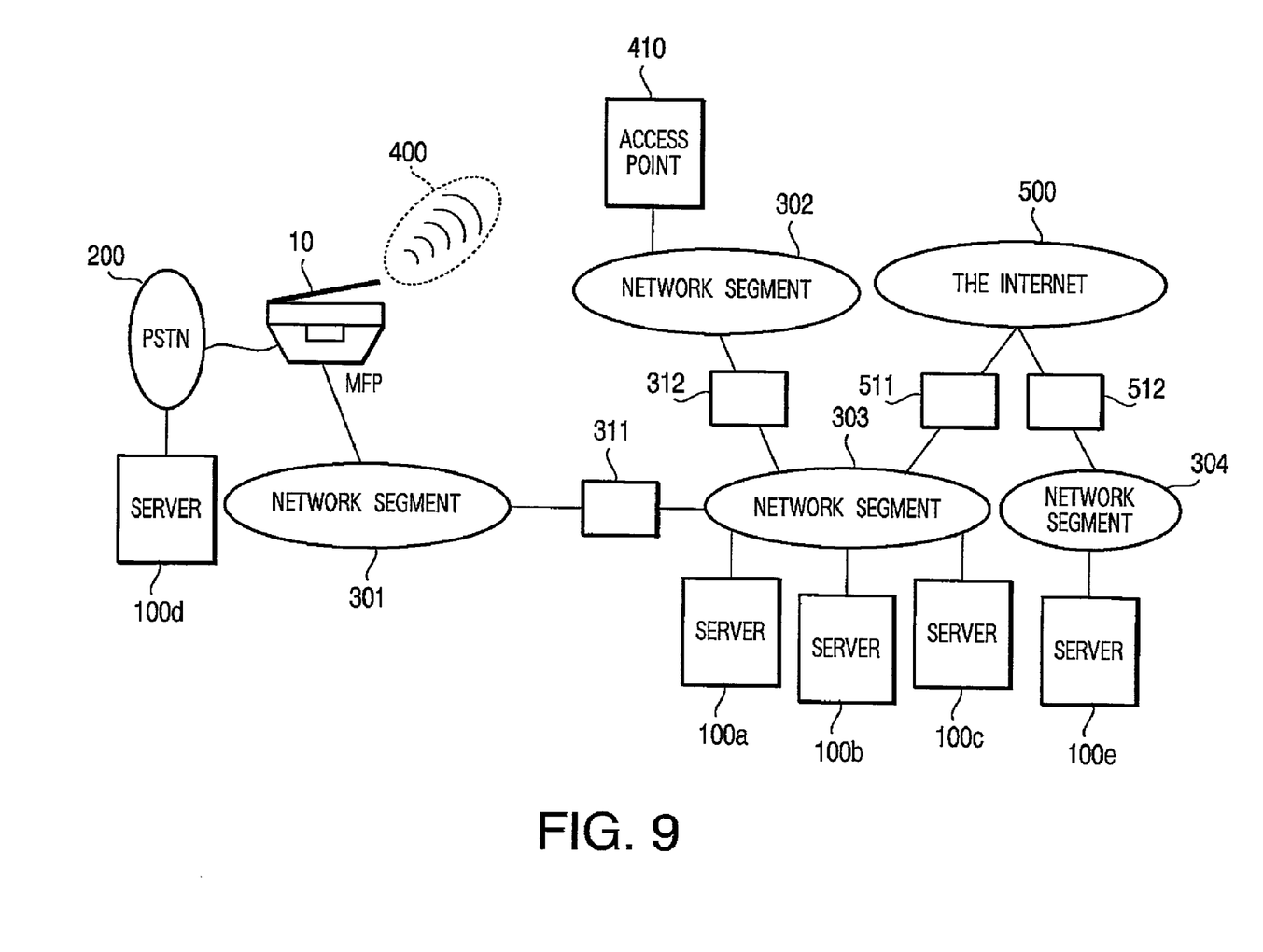
FIG. 9 schematically shows a network system according to aspects of a second embodiment.

For example, as shown in FIG. 9, a server device 100d may be connected to the MFP 10 via the PSTN 200, and a network 304 may be connected to the Internet 500 via a broad band router 512, a server 100e being connected with the network 304. In this configuration, the server device 100d and 100e may have the configuration shown in FIG. 6, while the server device 100d may function as the mail server. The server device 100d may function as the FTP server and/or WEBDAV server. In such a configuration, the MFP 10 is connected to the PSTN 200, which is the wired communication network, through the wired communication interface 18c, the MFP 10 can connect to the server device 100d through the PSTN 200. The server device 100d may further connect to the Internet 500 by the dial up connection through the PSTN 200, thereby the MFP 10 can connect to the sever devices 100a, 100b, 100c and 100e through the Internet 500.

Alternatively, the MFP 10 can connect to the server devices 100d and 100e through the wired communication interface 18a. Thus, the MFP 10 can use the wired communication interfaces 18a and 18c when connecting to the server devices 100a, 100b, 100c, 100d and 100e.

Figure 10:
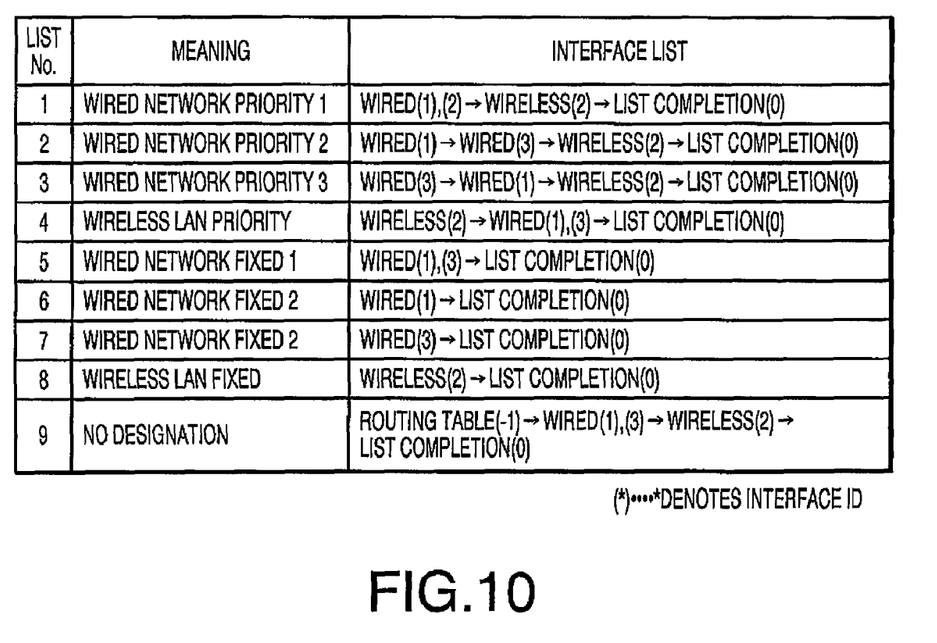
FIG. 10 shows a list of interfaces usable by a MFP according to aspects of the second embodiment.

For the above-described modification, the interface list can be set as indicated in FIG. 10. Since there are multiple wired communication interfaces (two in this modification), in the list, they are indicated as wired communication interfaces (1), (3) as in list No. 4 or No. 5, where the priority thereof being set evenly, or the they are indicated separately and different priories are assigned as in list No. 2 or No. 3. In this example, the interface ID of the communication interface 18c is three (3). When the list includes multiple communication interfaces having the same priority, a process may access all of the multiple communication interfaces consecutively (almost simultaneously) to check the availability of each interface, and use the one from which the availability is firstly confirmed. It should be noted that, when there are multiple wired communication interfaces, types of networks connected to respective interfaces need not be limited. Alternatively or optionally, there may be provided multiple wireless communication interfaces.

In the above-described exemplary embodiment and modifications, the MFP 10 is described as an embodiment of the communication apparatus. It should be noted that the invention should not be limited to such a configuration. The invention can be applied to any other communication apparatus as far as the communication apparatus is implemented with multiple client applications which may cause the communication apparatus to function as a client, which obtains data to be processed from an external server device through a network, and processes the obtained data, and/or which client processes other data stored in itself and transmits the processed data to an external server device, and is provided with multiple communication interfaces connected to communication networks.

What is claimed is:

1. A communication apparatus having multiple communication functions and to be connected to networks, comprising:

a controller that causes the communication apparatus to realize the multiple communication functions in accordance with multiple client applications, the multiple communication functions including at least one of a step of causing the communication apparatus to function as a client that obtains data to be processed from an external server device through the networks and processes the obtained data, and a step of causing the communication apparatus to process other data the communication apparatus stores and to transmit the processed data to the external server device;

multiple communication interfaces respectively connected to the networks;

an interface priority storage that stores priority information, wherein the priority information represents, for each of the multiple client applications, multiple communication interfaces which may be used by a client application in association with priorities of usage when the client applications is executed, respectively;

a communication interface determining system that retrieves the priority information corresponding to a client application to be executed from the interface priority storage and determines a communication interface to be used in accordance with the priority information as retrieved by the communication interface determining system; and an application executing system that executes the client application to be executed using the communication interface determined to be used by the communication interface determining system, wherein the communication interface determining system comprises:

a usable interface selecting system that selects a usable communication interface to be used when the client application is executed from among the multiple communication interfaces in accordance with the priority information; and an availability judging system that judges whether the usable communication interface selected by the usable interface selecting system is available, wherein the usable communication interface is used when the availability judging system judges that the usable communication interface is available, and a communication interface having a next priority is used when the availability judging system judges that the usable communication interface is unavailable.

2. The communication apparatus according to claim 1, further comprising:

a priority information input unit that allows input of the priority information corresponding to the multiple communication interfaces; and a priority information setting system that causes the interface priority storage to store the priority information input through the priority information input unit in association with identification information of the communication interfaces.

3. The communication apparatus according to claim 1, wherein the interface availability judging system attempts to connect the server device using the usable communication interface selected by the usable interface selecting system, the interface availability judging system determining the usable communication interface is unavailable if the connection to the server device is not achieved within a predetermined period of time.

4. The communication apparatus according to claim 1, wherein the priority information includes a priority assigned to a plurality of communication interfaces, wherein the usable interface determining system includes:

an access availability checking system that transmits predetermined data to each of the plurality of communication interfaces having the same priority to check the availability of all the plurality of communication interfaces having the same priority;

an access availability receiving system that receives access availability information containing information whether the interface is available, which is returned from respective ones of the plurality of communication interfaces having the same priority in response to the predetermined data transmitted by the access availability checking system; and an availability judging system that determines that a communication interface is available if the access availability receiving system receives the access availability information containing information representing an availability of the communication interface, the availability judging system determining that a communication interface is unavailable if the access availability receiving system receives the access availability information containing information representing an unavailability of the communication interface, and wherein the availability judging system determines one of the communication interfaces that transmits the access availability information earliest among the plurality of communication interfaces as the usable communication interface if the availability judging system receives the access availability information representing that the communication interface is available from each of the plurality of communication interfaces.

5. The communication apparatus according to claim 1, wherein the priority information defines a predetermined communication interface as a single usable communication interface, and the other communication interfaces as unusable ones.

6. The communication apparatus according to claim 1, further comprising access path determining system that determines an access path, which includes the communication interface, to the server device based on a priority access path information preliminarily stored in a routing table, wherein the priority information defines a communication interface included in the access path determined by the access path determining system as the usable communication interface.

7. The communication apparatus according to claim 1, wherein the multiple communication interfaces includes at least a wireless communication interface and a wired communication interface.

8. The communication apparatus according to claim 7, wherein, when the client application is of a first predetermined category, the priority information defines one of a wired communication priority setting and a wired communication fixed setting, the wired communication priority setting being a setting where the wired communication interface has a first priority and the wireless communication interface is a second priority, the wired communication fixed setting being a setting where only the wired communication interface is allowed to be used, and wherein, when the client application is of a second predetermined category, the priority information defines the wireless communication priority setting and a wireless communication fixed setting, the wireless communication priority setting being a setting where the wireless communication interface has a first priority and the wired communication interface is a second priority, the wireless communication fixed setting being a setting where only the wireless communication interface is allowed to be used.

9. The communication apparatus according to claim 8, wherein the client application falling in the first category requires an input operation by a user, and wherein the client application falling in the second category does not require the input operation by the user.

10. A computer usable medium comprising computer readable instructions to be executed by a computer which can be implemented in a communication apparatus having multiple communication functions and to be connected to networks, the communication apparatus capable of executing the multiple communication functions in accordance with multiple client applications, the multiple functions including at least one of a step of causing the communication apparatus to function as a client that obtains data to be processed from an external server device through the networks and to process the obtained data, and a step of causing the communication apparatus to process other data the communication apparatus stores and to transmit the processed data to the external server device, wherein the computer readable instructions provide, when executed by the computer, the communication apparatus with functions of:

an interface priority storage that stores priority information, wherein the priority information represents, for each of the multiple client applications, multiple communication interfaces which may be used by a client application in association with priorities of usage when the client applications is executed, respectively;

a communication interface determining system that retrieves the priority information corresponding to a client application to be executed from the interface priority storage and determines a communication interface to be used in accordance with the priority information as retrieved by the communication interface determining system; and an application executing system that executes the client application to be executed using the communication interface determined to be used by the communication interface determining system, wherein the communication interface determining system comprises:

a usable interface selecting system that selects a usable communication interface to be used when the client application is executed from among the multiple communication interfaces in accordance with the priority information; and an availability judging system that judges whether the usable communication interface selected by the usable interface selecting system is available, wherein the usable communication interface is used when the availability judging system judges that the usable communication interface is available, and a communication interface having a next priority is used when the availability judging system judges that the usable communication interface is unavailable.

* * * * *